June 19, 1951  E. H. DICKENSON  2,557,375
SELF-CLEANING STRAINER FOR FLUIDS
Filed Jan. 19, 1949
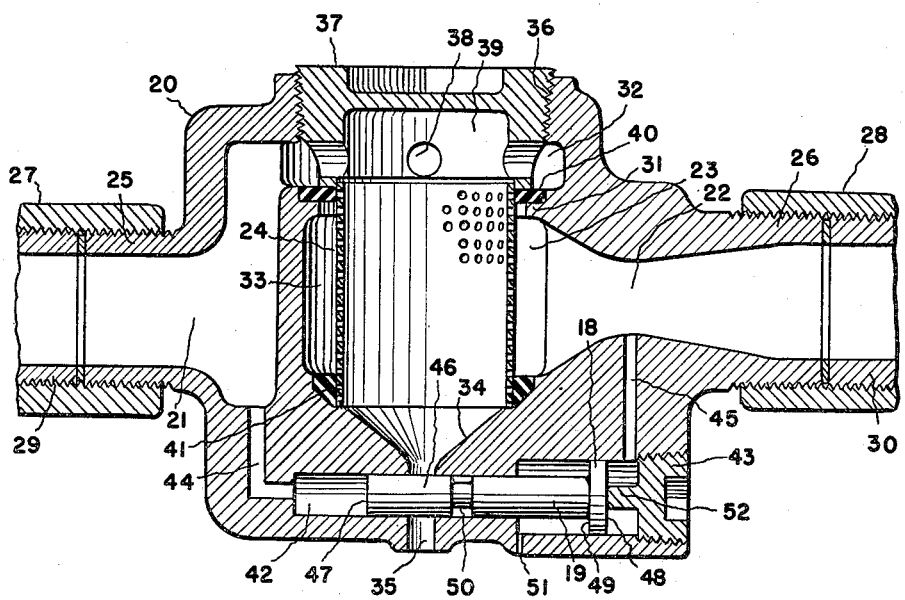
INVENTOR
ERNEST H. DICKENSON
BY
HIS ATTORNEY.

Patented June 19, 1951

2,557,375

UNITED STATES PATENT OFFICE 2,557,375

SELF-CLEANING STRAINER FOR FLUIDS

Ernest H. Dickenson, Johannesburg, Transvaal, Union of South Africa, assignor to Ingersoll-Rand Company, New York, N. Y., a corporation of New Jersey Application January 19, 1949, Serial No. 71,660

4 Claims. (Cl. 210—167)

This invention relates to strainers, and more particularly to a strainer for filtering entrained solids from the pressure fluid stream supplied to a pressure fluid operated tool.

One object of the invention is to prevent dirt and foreign particles in the pressure fluid from getting into the tool.

Another object of the invention is to make the strainer self-cleaning.

Another object of the invention is to remove the dirt collected by the screen from the strainer at frequent intervals.

Other objects will be in part obvious and in part pointed out hereinafter.

In the drawing accompanying this specification and in which similar references refer to similar parts, the figure in the drawing is a sectional view on a vertical plane passing through the axis of the inlet and outlet openings of the strainer.

Referring more particularly to the drawing, 20 designates a casing comprising an inlet conduit 21 and a venturi-shaped outlet conduit 22 for conveying pressure fluid to and from a chamber 23. A screen 24 within the chamber 23 filters said pressure fluid, and threaded connections 25—26 engage threaded sleeves 27—28 on the hose to effect engagement with the ends 29—30 of the hose.

The chamber 23 is divided by a flange 31 of the casing 20 into an inlet chamber 32 and a main chamber 33. The bottom of the main chamber 33 has a coniform surface 34 converging upon a passageway 35 to form with said passageway a funnel-shaped outlet for the chamber. The inlet chamber 32 has a threaded portion 36 to receive an externally threaded retaining plug 37 which forms a seal for the chamber and retains the screen 24 securely within the main chamber 33.

The retaining plug 37 has a series of ports 38 and an internal recess 39 connecting with the said ports. Rubber sealing rings 40—41 are mounted around the screen 24 to effect a seal between the screen 24 and the casing 20. The screen 24 is shown as being of cylindrical shape and is of smaller diameter than the main chamber 33 in order to provide a space between the screen and the wall of said chamber for the reception of the filtered pressure fluid and is retained concentrically within the main chamber 33 by the retaining plug 37.

A valve chamber 42 in the casing having two different diameters intersects the passageway 35. The smaller diameter of the valve chamber 42 is of greater diameter than the passageway 35 and it is this portion which intersects the passageway. A reciprocatory valve 46 having a stem 19, a head 18 and opposed actuating surfaces 47—48 of unequal areas on the free end of the stem and on the outer end of the head, respectively, resides in the valve chamber 42 and has a groove in the stem 19 which forms an annular passageway 50 around the valve and is so located from the ends of the valve that when the valve is in its extreme positions the passageway 50 is out of alignment with the passageway 35. The actuating surface 47 of the stem 19 is subjected to the pressure fluid in the inlet conduit by a passageway 44 which connects the smaller end of the valve chamber 42 with the inlet conduit 21. The actuating surface 48 of the head 18 is subjected to the pressure fluid in the throat of the outlet conduit by a passageway 45 which connects the larger end of the valve chamber with the throat of the venturi of the outlet conduit. A passageway 51 communicates the back surface 49 of the piston head 18 with the atmosphere.

The valve chamber is sealed by a plug 43 which threads into the larger bore of the valve chamber. A projection 52 on the plug 43 prevents the valve 46 from blocking off the passageway 45.

In the normal operation of the device, pressure fluid flows through the inlet conduit 21 into the inlet chamber 32 thence through the ports 38 in the retaining plug 37 to the internal recess 39 from whence it enters the screen 24. After passing through the screen the pressure fluid proceeds through the venturi of the outlet conduit 22 to the hose 30. While the pressure fluid is flowing through the conduits the piston valve 46 is in the extreme rightwardly position. As long as there is a flow of pressure fluid through the conduits there is a decreased pressure at the throat of the venturi in the outlet conduit 22. The pressure in the inlet conduit 21 acts against the actuating surface 47 through the passageway 44 while the decreased pressure at the throat of the venturi acts against the larger actuating surface 48 through the passageway 45.

The differential in pressure on the two actuating surfaces overcomes the difference in areas of the actuating surfaces and allows the piston valve 46 to remain in its extreme rightwardly position as shown in the drawing. When the flow of pressure fluid through the conduits is stopped the pressure at the throat of the venturi equals the pressure of the pressure fluid in the inlet conduit 21 and the actuating surfaces 47—48 are subjected to equal pressures. Because of the greater area of the actuating surface 48 the piston valve 46 is thrust to its extreme leftwardly position.

In passing to this position the annular passageway 50 momentarily aligns itself with the passageway 35. When this happens the pressure fluid in the chamber exhausts the dirt and foreign particles collected by the screen to the atmosphere through the passageway 35. When the flow of pressure fluid through the conduits is again established there is a decreased pressure again set up at the throat of the venturi conduit and at the actuating surface 48. The pressure fluid at the actuating surface 47, having a greater pressure than the pressure fluid at the actuating surface 48, thrusts the piston 46 to its extreme rightwardly position. In passing to this position the passageway 50 of the piston 46 again is momentarily aligned with the passageway 35 and the dirt collected by the screen 24 is again exhausted to the atmosphere through the passageway 35. The valve 46 remains in the extreme rightwardly position, as shown in the drawing, as long as the flow of pressure fluid through the conduits is maintained.

The present invention has been found to possess advantages desirable in straining devices. The strainer is self-cleaning and this obviates the necessity of periodically inspecting and cleaning the strainer. The valve controlling the exhaust passageway is so constructed that dirt and foreign particles are exhausted from the strainer whenever the flow of pressure fluid in the strainer stops or starts, thereby insuring frequent cleaning of the strainer.

I claim:

1. A straining device comprising a casing having a chamber, inlet and outlet conduits for conveying pressure fluid to and from said chamber, a screen within said chamber for filtering the pressure fluid, means in one of the conduits for producing an area of pressure lower than the normal operating pressure of the conduit during normal flow of the pressure fluid, a passageway for discharging dirt and foreign particles from the chamber, and a valve for controlling said passageway having an actuating surface subjected to the operating pressure of the fluid in one of the conduits and an opposed actuating surface of greater area than the first-mentioned surface subjected to the lower-pressured fluid created by said means, thereby moving the valve in one direction to uncover the passageway, said last-mentioned actuating surface being subjected, upon cessation of flow of pressure fluid through the conduits, to the normal operating pressure of the fluid in the conduit, thereby moving the valve in the opposite direction to again uncover said passageway.

2. A straining device comprising a casing having a chamber, inlet and outlet conduits for conveying pressure fluid to and from said chamber, one of said conduits being shaped as a venturi to produce a differential of pressure between said conduits, a screen within and removable from said chamber for filtering the pressure fluid, a passageway for discharging dirt from said chamber, and means for controlling said passageway comprising a valve chamber intersecting the passageway and a valve slidable therein having opposed actuating surfaces of unequal areas, the larger surface thereof being subjected to pressure fluid from the throat of the venturi, and the other actuating surface of said valve being subjected to pressure fluid from the other of said conduits.

3. A straining device comprising a casing having a chamber, an inlet conduit for conveying pressure fluid to said chamber, a venturi-shaped outlet conduit for conveying pressure fluid from said chamber and for producing a differential of pressure between said inlet and outlet conduits, a screen within and removable from said chamber for filtering the pressure fluid, a passageway for discharging dirt from said chamber, means for controlling said passageway comprising a valve chamber intersecting the passageway and a valve slidable therein having opposed actuating surfaces of unequal areas and a groove forming a passageway around the valve to allow the dirt in the chamber to be discharged to the atmosphere when said groove in the valve aligns itself with the passageway from said chamber, a passageway in the casing communicating the larger actuating surface of said valve with the pressure fluid in the throat of the venturi, and a passageway in the casing communicating the other actuating surface of said valve with the pressure fluid in the inlet conduit.

4. A straining device comprising a casing having a chamber, inlet and outlet conduits for conveying pressure fluid to and from said chamber, a screen within the chamber for filtering the pressure fluid, means in one of the conduits for reducing the pressure of the pressure fluid in the conduit during flow of pressure fluid therethrough, a passageway for discharging dirt and foreign particles from the chamber, and a valve to control the passageway having an actuating surface subjected to the pressure of the fluid in one of the conduits and an opposed actuating surface subjected to the lower-pressured fluid in the other conduit, thereby actuating the valve to uncover the passageway.

E. H. DICKENSON.

REFERENCES CITED

The following references are of record in the file of this patent:

UNITED STATES PATENTS

| Number | Name | Date |
|--------|------|------|
| 938,574 | Goldsmith | Nov. 2, 1909 |
| 1,438,983 | Collin | Dec. 19, 1922 |
| 2,134,061 | Thomas | Oct. 25, 1938 |

FOREIGN PATENTS

| Number | Country | Date |
|--------|---------|------|
| 528,920 | Great Britain | Nov. 11, 1940 |